US008208555B2

(12) United States Patent
Wu

(10) Patent No.: US 8,208,555 B2
(45) Date of Patent: Jun. 26, 2012

(54) IMAGE CAPTURING AND TRANSMISSION DEVICE AND IMAGE RECEIVING AND RECONSTRUCTION DEVICE

(75) Inventor: Jen-Chih Wu, Taipei County (TW)

(73) Assignee: Vivotek Inc., Taipei County (TW)

( * ) Notice: Subject to any disclaimer, the term of this patent is extended or adjusted under 35 U.S.C. 154(b) by 315 days.

(21) Appl. No.: 12/709,812

(22) Filed: Feb. 22, 2010

(65) Prior Publication Data

US 2011/0134993 A1     Jun. 9, 2011

(30) Foreign Application Priority Data

Dec. 4, 2009 (TW) ............................... 98141633 A

(51) Int. Cl.
*H04B 1/66* (2006.01)

(52) U.S. Cl. ......... 375/240.21; 375/240.24; 375/240.01; 375/240.26; 382/239; 382/243; 382/235; 382/232

(58) Field of Classification Search ............. 375/240.21, 375/240.24, 240.01, 240.26; 382/239, 243, 382/235, 232
See application file for complete search history.

(56) References Cited

U.S. PATENT DOCUMENTS

| 5,430,812 | A  | * | 7/1995 | Barnsley et al. | ............... | 382/235 |
| 7,489,833 | B2 | * | 2/2009 | Nishio | ........................... | 382/293 |
| 7,587,738 | B2 | * | 9/2009 | Nakamura et al. | ............. | 725/105 |
| 2002/0018587 | A1 | | 2/2002 | Ueda | | |

FOREIGN PATENT DOCUMENTS

| TW | 555342 | 9/2003 |
| TW | 200714020 | 4/2007 |
| TW | 200830868 | 7/2008 |

OTHER PUBLICATIONS

Intellectual Property Office, Ministry of Economic Affairs, R.O.C., "Office Action", Apr. 9, 2012, Taiwan.

* cited by examiner

*Primary Examiner* — Shawn An
(74) *Attorney, Agent, or Firm* — Morris Manning & Martin LLP; Tim Tingkang Xia, Esq.

(57) ABSTRACT

An image capturing and transmission device includes an image capturing module, an image processor, an image encoder, and a network transmission module. The image capturing module is used for capturing a scene of an area to be displayed and outputting image data. The image processor converts the image data according to a first and a second cutting areas and a first and a second shrink ratio values, and outputs a first and a second sub-images. The first cutting area includes the second cutting area, and the first shrink ratio value is greater than the second shrink ratio value. The image encoder encodes the first and the second sub-images according to first and second encoding information, and outputs a first and a second streaming images. The network transmission module is used for transmitting the first and the second streaming images.

10 Claims, 4 Drawing Sheets

IMAGE CAPTURING AND TRANSMISSION DEVICE AND IMAGE RECEIVING AND RECONSTRUCTION DEVICE

CROSS-REFERENCE TO RELATED APPLICATIONS

This non-provisional application claims priority under 35 U.S.C. §119(a) on Patent Application No(s). 098141633 filed in Taiwan, R.O.C. on Dec. 4, 2009, the entire contents of which are hereby incorporated by reference.

BACKGROUND

1. Field of Invention

The present invention relates to an image processing device, and more particularly to an image capturing and transmission device and an image receiving and reconstruction device.

2. Related Art

With the rapid development of the network technology, new products derived from different application networks emerge accordingly. One technology for application among them is IP camera.

Appearing in about 1998, the IP camera makes use of advanced multimedia video and image compression technologies in combination with the advantage of being boundless of the Internet, so that a user can view real-time digital high-definition images transmitted from an IP camera installed at a remote location through the Internet and browsers at any time.

Currently, the global broadband network construction is perfected day by day, such that video monitoring can be combined with the network, wireless communication, or other technologies. A digitized image may be transmitted over various networks to achieve the purpose of remote real-time image monitoring. With the continuous improvement of the network technology, an IP camera system is gradually feasible in place of an existing monitoring system.

Due to the limitation of a viewing angle of a lens, the IP camera captures a limited image area. When the user intends to switch a monitored area, the user must operate the IP camera and rotate the lens of the IP camera to a specific angle using a rotating mechanism. Such an IP camera with a switchable lens angle is referred to as a (Pan/Tilt/Zoom) PTZ IP camera. The so-called PTZ represents that the lens of the camera have different functions such as panning, tilting, and zooming. However, in the process of panning or tiling, much time is spent on mechanical operation. In addition, the IP camera is always damaged due to friction during the long-time rotation.

It is suggested to use a wide-angle lens to increase the viewing angle of the lens in the prior art. However, an image shot by the wide-angle lens is not as clear as that shot by a conventional zoom lens. With the mature of the multi-megapixel sensor technology, the unclear problem can be alleviated but with the increasing of bandwidth. A file size of an image captured by the multi-megapixel sensor is larger than that of an image captured by an ordinary sensor, so a high bandwidth is required for smoothly transmitting the multi-megapixel image to a user end using the network.

SUMMARY

Accordingly, the present invention provides an image capturing and transmission device.

The image capturing and transmission device comprises an image capturing module, an image processor, an image encoder, and a network transmission module.

The image capturing module is used for capturing a scene of an area to be displayed and outputting image data.

The image processor converts the image data according to a first cutting area and a first shrink ratio value and outputs a first sub-image, and converts the image data according to a second cutting area and a second shrink ratio value and outputs a second sub-image. The first cutting area comprises the second cutting area, and the first shrink ratio value is greater than the second shrink ratio value.

The image encoder encodes the first sub-image according to first encoding information and outputs a first streaming image, and encodes the second sub-image according to second encoding information and outputs a second streaming image.

The network transmission module is used for transmitting the first streaming image and the second streaming image.

The present invention further provides an image receiving and reconstruction device suitable for receiving and reconstructing the first streaming image and the second streaming image, which comprises a network receiving module, an image decoder, and an image reconstructor.

The network receiving module is used for receiving the first streaming image and the second streaming image transmitted by a network transmission module.

The image decoder decodes the first streaming image according to first decoding information and outputs a first sub-image, and decodes the second streaming image according to second decoding information and outputs a second sub-image.

The image reconstructor converts the first sub-image into a first restored image according to a first original area and a first original pixel value, converts the second sub-image into a second restored image according to a second original area and a second original pixel value, and overlays the second restored image on the first restored image. The second original area is a part of the first original area.

With the image capturing and transmission device and the image receiving and reconstruction device, the traffic required in the transmission of the image is greatly reduced. Thus, the image can be transmitted using a current ordinary network. In addition, a user may select specific areas of interest which are transmitted with the same resolution so as to keep the frame in the specific areas clear and distinguishable.

BRIEF DESCRIPTION OF THE DRAWINGS

The present invention will become more fully understood from the detailed description given herein below for illustration only, and thus are not limitative of the present invention, and wherein.

DETAILED DESCRIPTION

The detailed features and advantages of the present invention are described below in great detail through the following embodiments, the content of the detailed description is sufficient for those skilled in the art to understand the technical content of the present invention and to implement the present invention there accordingly. Based upon the content of the specification, the claims, and the drawings, those skilled in the art can easily understand the relevant objectives and advantages of the present invention. The following embodiments are intended to describe the present invention in further detail, but not intended to limit the scope of the present invention in any way.

Figure 1:
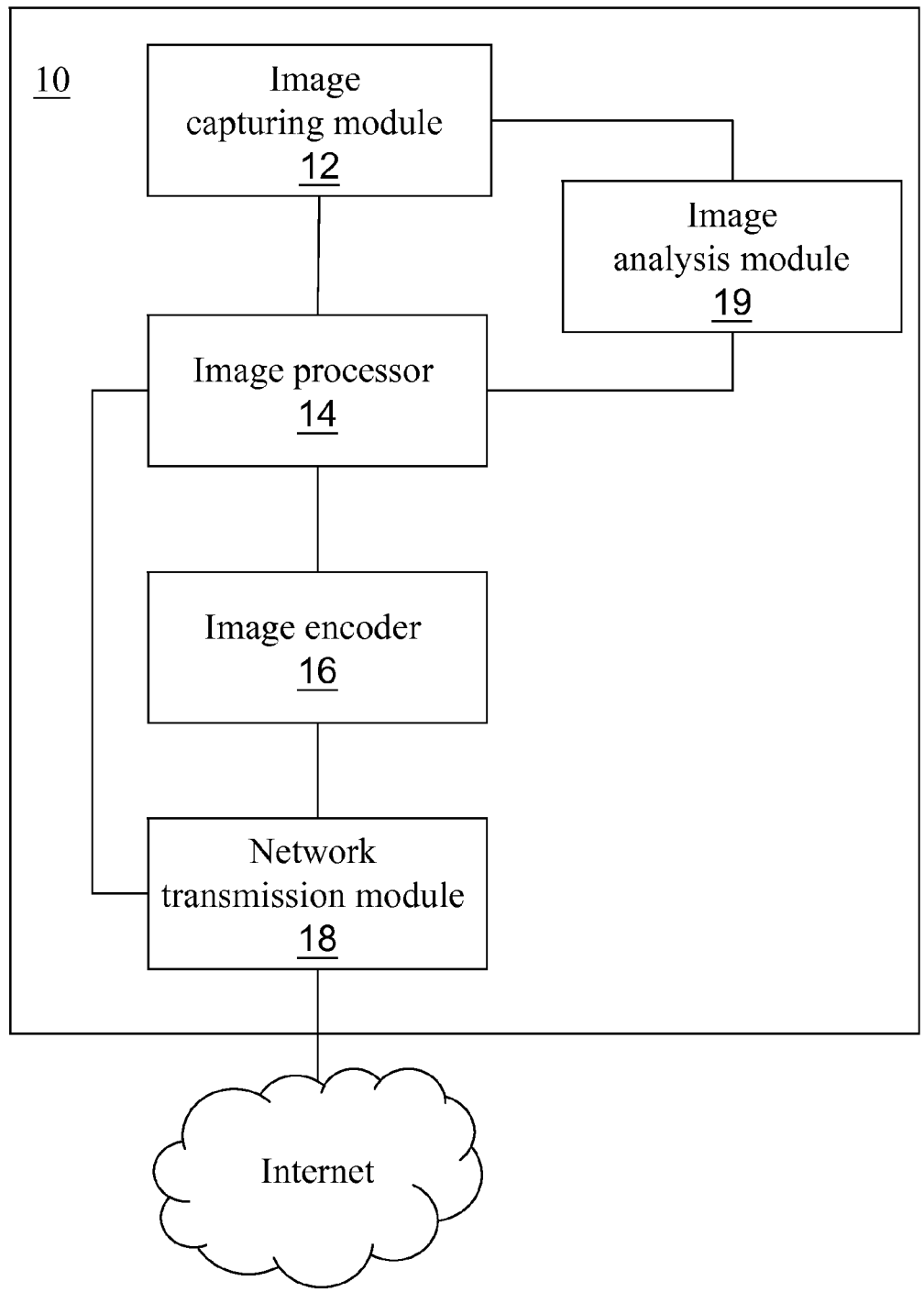
FIG. 1 is a system block diagram of an image capturing and transmission device according to the present invention.

FIG. 1 is a system block diagram of an image capturing and transmission device according to the present invention. Referring to FIG. 1, the image capturing and transmission device 10 comprises an image capturing module 12, an image processor 14, an image encoder 16, and a network transmission module 18.

The image capturing module 12 is used for capturing a scene of an area to be displayed and outputting image data.

The image processor 14 converts the image data according to a first cutting area and a first shrink ratio value and outputs a first sub-image, and converts the image data according to a second cutting area and a second shrink ratio value and outputs a second sub-image. The first cutting area comprises the second cutting area, and the first shrink ratio value is greater than the second shrink ratio value.

The image encoder 16 encodes the first sub-image according to first encoding information and outputs a first streaming image, and encodes the second sub-image according to second encoding information and outputs a second streaming image. A compression format of the first streaming image and the second streaming image may be, but not limited to, a Moving Picture Experts Group-4 (MPEG-4) format streaming data, an H.264 format streaming data, a Motion Joint Photographic Experts Group (MJPEG) format streaming data, a Video Codec 1 (VC-1) format streaming data, or a Third Generation Partnership (3GP) format streaming data.

The network transmission module 18 is used for transmitting the first streaming image and the second streaming image. The network transmission module 18 may be, but not limited to, an Institute of Electrical and Electronics Engineers (IEEE) 802.3 network transmission module or an IEEE 802.11 network transmission module.

The image capturing and transmission device will be illustrated in further details below. In order to enlarge the user's field of view, the image capturing module 12 has a wide-angle lens. In addition, the image capturing module 12 comprises a plurality of photosensitive units. The photosensitive units are charge-coupled devices (CCDs) or complementary metal-oxide semiconductors (CMOSs). The CCDs or CMOSs can convert optical signals into electrical signals. After amplification and analog/digital conversion, the electrical signals are formed into image data. The number of the photosensitive units in the image capturing module 12 is a resolution of the image capturing module 12. For example, if the image capturing module 12 has 1920×1200 photosensitive units, the resolution of the image capturing module 12 is 1920×1200. The pixel value of the image data is 1920×1200 when the image capturing module 12 captures and outputs the image data using the highest resolution.

The image processor 14 converts the image data into the first sub-image and the second sub-image according to the first cutting area, the first shrink ratio, the second cutting area, and the second shrink ratio.

The first cutting area is defined by a first coordinate, a first cutting length, and a first cutting width, and the second cutting area is defined by a second coordinate, a second cutting length, and a second cutting width. In addition, the first cutting area may also be defined by a first principal coordinate and a first sub-coordinate, in which the first principal coordinate and the first sub-coordinate respectively represent two coordinates of vertices of opposite angles in the first cutting area. The second cutting area may also be defined by a second principal coordinate and a second sub-coordinate.

In this embodiment, the range of the first cutting area is equal to the complete range of the image data. In order to reduce the transmission amount in the transmission, the pixel value of the first sub-image is reduced. A ratio of the original pixel value to the reduced pixel value of the first sub-image is the first shrink ratio value. The range of the second cutting area is smaller than and is a part of the range of the first cutting area. In order to keep the second sub-image clear and distinguishable, the pixel value of the second sub-image may be equal to that in the second cutting area.

Figure 2:
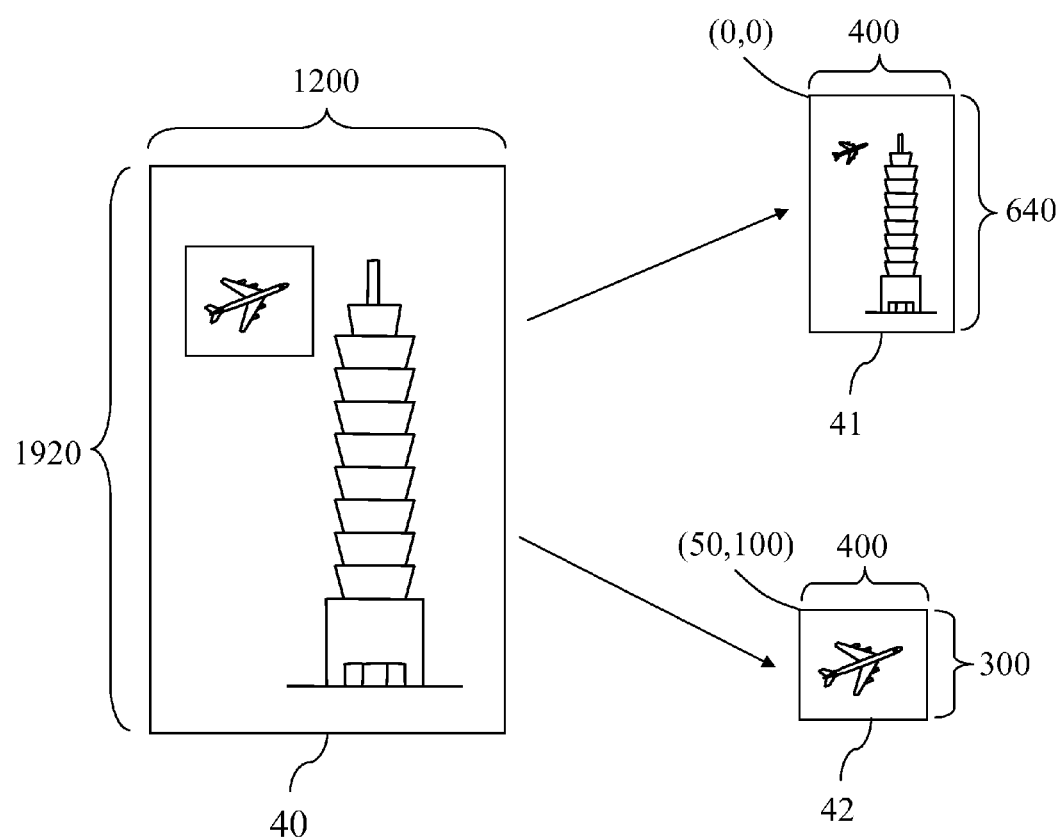
FIG. 2 is a schematic view of an operation of an image processor according to the present invention.

FIG. 2 is a schematic view illustrating an operation of the image processor 14 according to the present invention. For example, the pixel value of the image data 40 input into the image processor 14 is 1920×1200. The first coordinate, the first cutting length, and the first cutting width of the first cutting area are respectively defined as (0,0), 1920 pixels, and 1200 pixels. Besides, the first shrink ratio value is 9. Thus, the pixel value of the first sub-image 41 is 640×400, and the range displayed by the first sub-image 41 is the same as that of the image data 40. The second coordinate, the second cutting length, and the second cutting width of the second cutting area are respectively defined as (50,100), 400 pixels, and 300 pixels. Besides, the second shrink ratio value is 1. Thus, the pixel value of the second sub-image 42 is 300×400, and the number of pixels per unit area of the second sub-image 42 is the same as that of the image data 40.

The above first cutting area, first shrink ratio value, second cutting area, and second shrink ratio value may be set by a user end through the Internet or dynamically selected by an intelligent image recognition method.

If the first cutting area, first shrink ratio value, second cutting area, and second shrink ratio value are set by the user end through the Internet, the network transmission module 18 may be used to further receive a selection instruction. After receiving the selection instruction, the network transmission module 18 transmits the selection instruction back to the image processor 14. The image processor 14 determines the first cutting area, the first shrink ratio value, the second cutting area, and the second shrink ratio value according to the selection instruction. Generally speaking, the first cutting area is usually equal to, but may also be slightly smaller than, the range of the image data 40. Moreover, the first shrink ratio value may be adjusted by the user according to the network condition or hardware speed. The greater the first shrink ratio value is, the smaller the capacity occupied by a file of the first sub-image 41 is.

If the first cutting area, first shrink ratio value, second cutting area, and second shrink ratio value are dynamically selected by the intelligent image recognition method, the image capturing and transmission device 10 further comprises an image analysis module 19 for analyzing the image data and transmitting a selection instruction to the image processor 14. The image processor 14 determines the first cutting area, the first shrink ratio value, the second cutting area, and the second shrink ratio value according to the selection instruction. The image analysis module 19 may select the second cutting area according to a moving object in the image data or a feature (for example, a human face) of the object, and then determine the second shrink ratio value according to the second cutting area. The larger the second cutting area is, the greater the second shrink ratio value is; and vice versa.

The intelligent image recognition and dynamic selection method may also be executed by a server at a receiving end. After the second cutting area is determined, the server may set the image processor 14 through the Internet.

After the image processor 14 outputs the first sub-image 41 and the second sub-image 42, the image encoder 16 encodes the first sub-image 41 into a first streaming image according to first encoding information and encodes the second sub-image 42 into a second streaming image according to second encoding information. The first encoding information and the second encoding information may be set by the user. The first encoding information and the second encoding information may comprise a compression format, a bit rate, a frame rate, an image quality, and a frame resolution of a streaming image. The bit rate may be a constant bit rate (CBR) or a variable bit rate (VBR). In addition, the image processor 14 may also encode the first sub-image 41 and the second sub-image 42 into various kinds of first streaming images and second streaming images of different compression formats, different frame resolutions, different bit rates, or different image qualities, so as to transfer them to various kinds of platforms for use and viewing. For example, the image processor 14 may encode the first sub-image 41 and the second sub-image 42 into a first high-definition streaming image and a second high-definition streaming image of an H.264 format, a high bit rate, and a high image quality for viewing by the user on a personal computer (PC). Besides, the image processor 14 may further encode the first sub-image 41 and the second sub-image 42 into a first low-definition streaming image and a second low-definition streaming image of a 3GP format, a low bit rate, and a low image quality for viewing by the user on a mobile phone.

In this embodiment, the image capturing and transmission device 10 may have two image encoders 16. The two image encoders 16 may encode the first sub-image 41 and the second sub-image 42 in parallel so as to enhance the encoding speed.

After the image encoder 16 outputs the first streaming image and the second streaming image, the first streaming image and the second streaming image are transmitted to the network transmission module 18 and transmitted to an image server or the user end through the Internet. Since the first sub-image 41 has been reduced to have a smaller pixel value in the processing, less transmission traffic is required in the transmission using the Internet. Besides, the pixel value of the second sub-image 42 remains unchanged, so the clarity of the frame is not changed.

On the other hand, an image receiving and reconstruction device needs to be provided at the image server or the user end for receiving and reconstructing the first streaming image and the second streaming image.

Figure 3:
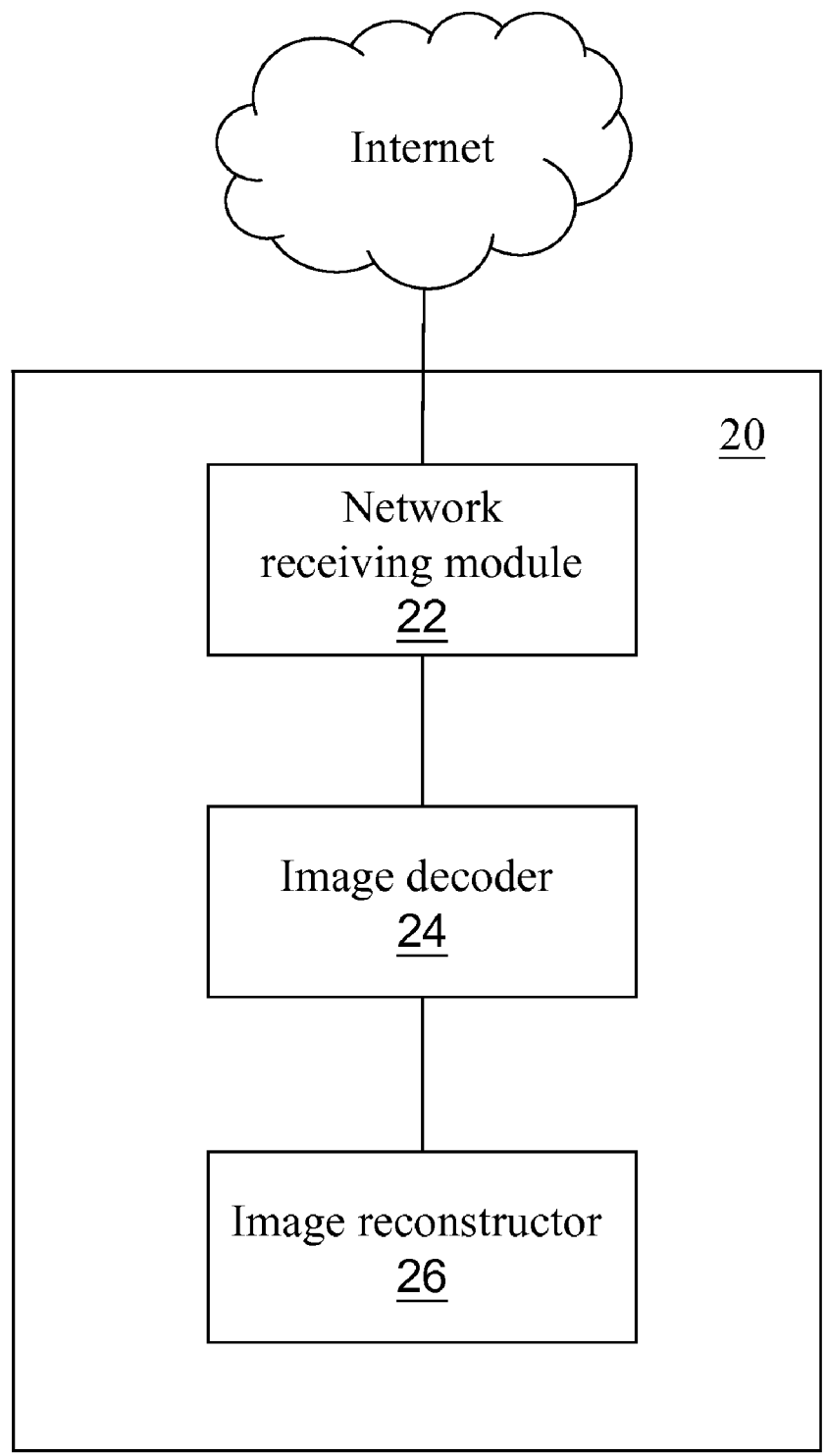
FIG. 3 is a system block diagram of an image receiving and reconstruction device according to the present invention.

FIG. 3 is a system block diagram of the image receiving and reconstruction device. Referring to FIG. 3, the image receiving and reconstruction device 20 comprises a network receiving module 22, an image decoder 24, and an image reconstructor 26.

The network receiving module 22 is used for receiving the first streaming image and the second streaming image transmitted by the network transmission module 18 in FIG. 1. The network receiving module 22 may be, but not limited to, an IEEE 802.3 network transceiving module or an IEEE 802.11 network transceiving module.

The image decoder 24 decodes the first streaming image according to first decoding information and outputs a first sub-image 41, and decodes the second streaming image according to second decoding information and outputs a second sub-image 42.

The image reconstructor 26 converts the first sub-image 41 into a first restored image according to a first original area and a first original pixel value, converts the second sub-image 42 into a second restored image according to a second original area and a second original pixel value, and overlays the second restored image on the first restored image. The second original area is a part of the first original area.

The image capturing and transmission device will be illustrated in further details below.

The network receiving module 22 and the network transmission module 18 in FIG. 1 may transfer information to each other. The network receiving module 22 and the network transmission module 18 have the same or compatible network protocols. After receiving the first streaming image and the second streaming image, the network receiving module 22 transfers the first streaming image and the second streaming image to the image decoder 24.

The decoding operation performed by the image decoder 24 is an inverse operation of the encoding operation of the image encoder 16 in FIG. 1. That is to say, the image decoder 24 may decode the first streaming image and the second streaming image into a first decoded image and a second decoded image.

In this embodiment, the pixel value of the first decoded image is 640×400, and the pixel value of the second decoded image is 300×400. After the decoding, the first decoded image and the second decoded image are transmitted to the image reconstructor 26 for reconstruction.

The image reconstructor 26 restores the first decoded image and the second decoded image according to a first restoration area, a first amplification ratio value, a second restoration area, and second amplification ratio value. The first restoration area is defined by a first coordinate, a first original length, and a first original width. The second restoration area is defined by a second coordinate, a second original length, and a second original width. In this embodiment, preferably, the first restoration area is equal to the first cutting area, and the second restoration area is equal to the second cutting area.

Illustration is made again through the above embodiment, in which the first cutting length and the first cutting width of the first cutting area are respectively defined as 1920 pixels and 1200 pixels. That is, the first original length is 1920 pixels, and the first original width is 1200 pixels. The image reconstructor 26 amplifies and converts the first decoded image with the original pixel value being 640×400 into the first restored image with the pixel value being 1920×1200. Although the pixel value of the first restored image is 1920×1200, only 640×400 pixels in the first decoded image are actually effective information, and the remaining pixels are all pictures estimated by an interpolation method. As a result, the first restored image is blurry as compared with the first cut image.

On the other hand, the second cutting length and the second cutting width of the second cutting area are respectively 400 pixels and 300 pixels. That is to say, the second original length is 400 pixels, and the second original width is 300 pixels. Since the size of the second decoded image is equal to that of the restoration area in this embodiment, i.e., both 400×300 pixels, the amplification step does not need to be performed when the second decoded image is converted into the second restored image. As a result, the second restored image is as clear as the second cut image.

Figure 4:
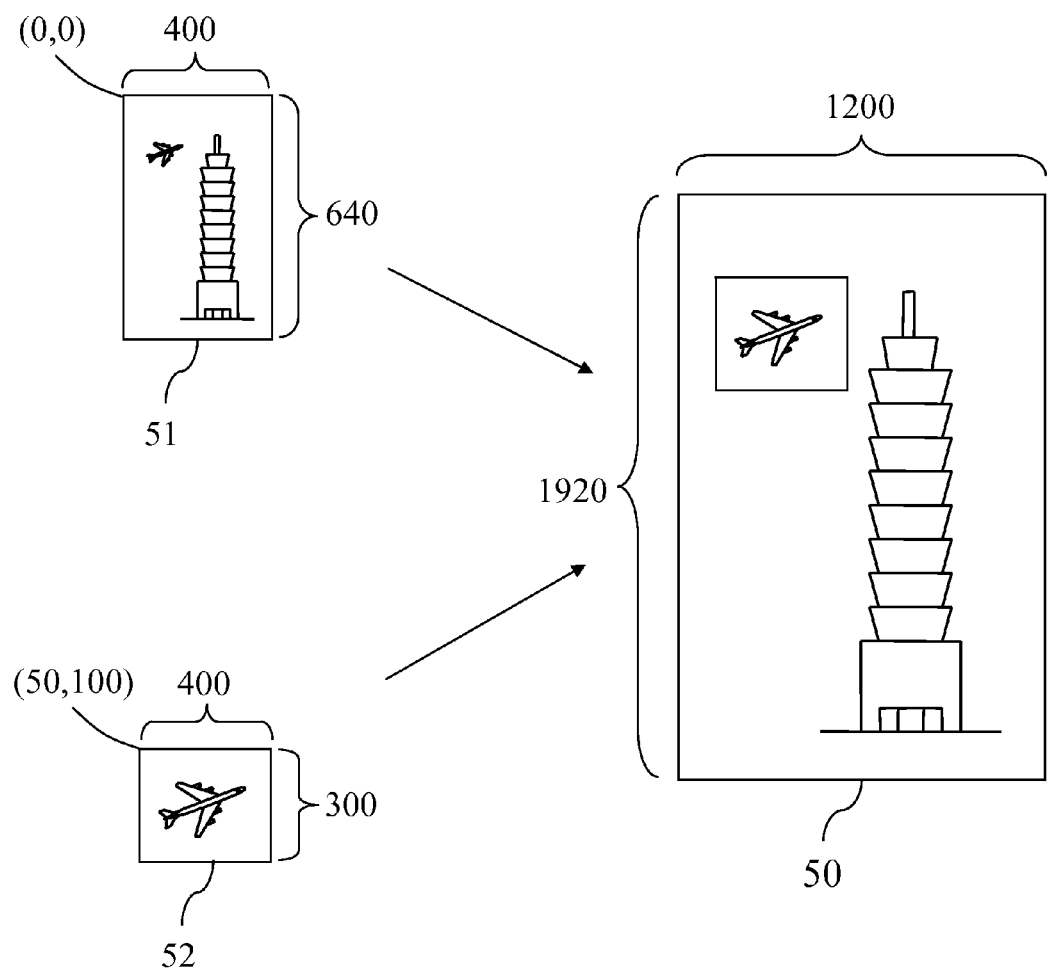
FIG. 4 is a schematic view illustrating an operation of an image reconstructor according to the present invention.

FIG. 4 is a schematic view illustrating an operation of the image reconstructor 26 according to the present invention. In this embodiment, the first coordinate is (0,0) and the second coordinate is (50,100). Upon determining relative positions of the first restored image and the second restored image according to the first coordinate and the second coordinate, the image reconstructor 26 overlays the second restored image 52 on the first restored image 51 and forms a reconstructed image 50.

With the image receiving and reconstruction device, a first streaming image and a second streaming image transmitted through the Internet may be compressed, decoded, and reconstructed, and the user can view the reconstructed image using various different platforms.

What is claimed is:

1. An image capturing and transmission device, comprising:
    an image capturing module, for capturing a scene of an area to be displayed and outputting an image data;
    an image processor, for converting the image data according to a first cutting area and a first shrink ratio value and outputting a first sub-image, and converting the image data according to a second cutting area and a second shrink ratio value and outputting a second sub-image, wherein the first cutting area comprises the second cutting area, and the first shrink ratio value is greater than the second shrink ratio value;
    an image encoder, for encoding the first sub-image according to a first encoding information and outputting a first streaming image, and encoding the second sub-image according to a second encoding information and outputting a second streaming image; and
    a network transmission module, for transmitting the first streaming image and the second streaming image.

2. The image capturing and transmission device according to claim 1, wherein the first cutting area is defined by a first coordinate, a first cutting length, and a first cutting width, and the second cutting area is defined by a second coordinate, a second cutting length, and a second cutting width.

3. The image capturing and transmission device according to claim 1, wherein the network transmission module is further used for receiving a selection instruction, the network transmission module transmits the selection instruction back to the image processor after receiving the selection instruction, and the image processor determines the first cutting area, the first shrink ratio value, the second cutting area, and the second shrink ratio value according to the selection instruction.

4. The image capturing and transmission device according to claim 1, further comprising an image analysis module, for analyzing the image data and transmitting a selection instruction to the image processor, wherein the image processor determines the first cutting area, the first shrink ratio value, the second cutting area, and the second shrink ratio value according to the selection instruction.

5. The image capturing and transmission device according to claim 1, wherein a compression format of the first streaming image and the second streaming image is a Moving Picture Experts Group-4 (MPEG-4) format streaming data, an H.264 format streaming data, a Motion Joint Photographic Experts Group (MJPEG) format streaming data, a Video Codec 1 (VC-1) format streaming data, or a Third Generation Partnership (3GP) format streaming data.

6. The image capturing and transmission device according to claim 1, wherein the network transmission module is an Institute of Electrical and Electronics Engineers (IEEE) 802.3 network transmission module or an IEEE 802.11 network transmission module.

7. An image receiving and reconstruction device, suitable for receiving and reconstructing the first streaming image and the second streaming image according to claim 1, comprising:
    a network receiving module, for receiving the first streaming image and the second streaming image;
    an image decoder, for decoding the first streaming image according to a first decoding information and outputting a first decoded image, and decoding the second streaming image according to a second decoding information and outputting a second decoded image; and
    an image reconstructor, for converting the first decoded image into a first restored image according to a first restoration area, converting the second decoded image into a second restored image according to a second restoration area, and overlaying the second restored image on the first restored image, wherein the second restoration area is a part of the first restoration area.

8. The image receiving and reconstruction device according to claim 7, wherein the first restoration area is defined by a first coordinate, a first original length, and a first original width, and the second restoration area is defined by a second coordinate, a second original length, and a second original width.

9. The image receiving and reconstruction device according to claim 7, wherein a compression format of the first streaming image and the second streaming image is a Moving Picture Experts Group-4 (MPEG-4) format streaming data, an H.264 format streaming data, a Motion Joint Photographic Experts Group (MJPEG) format streaming data, a Video Codec 1 (VC-1) format streaming data, or a Third Generation Partnership (3GP) format streaming data.

10. The image receiving and reconstruction device according to claim 7, wherein the network receiving module is an Institute of Electrical and Electronics Engineers (IEEE) 802.3 network transceiving module or an IEEE 802.11 network transceiving module.

* * * * *